(12) United States Patent
Ambapuram et al.

(10) Patent No.: US 9,717,051 B2
(45) Date of Patent: Jul. 25, 2017

(54) PROACTIVE CONTROL OF HARDWARE BASED UPON MONITORED PROCESSING

(71) Applicant: Qualcomm Innovation Center, Inc., San Diego, CA (US)

(72) Inventors: Sravan Kumar Ambapuram, Hyderabad (IN); Krishna V.S.S.S.R. Vanka, Hyderabad (IN); Shirish Kumar Agarwal, Hyderabad (IN); Nikhil Kumar Kansal, Hyderabad (IN)

(73) Assignee: QUALCOMM Innovation Center, Inc., San Diego, CA (US)

( * ) Notice: Subject to any disclaimer, the term of this patent is extended or adjusted under 35 U.S.C. 154(b) by 126 days.

(21) Appl. No.: 14/627,280

(22) Filed: Feb. 20, 2015

(65) Prior Publication Data

US 2016/0249290 A1 Aug. 25, 2016

(51) Int. Cl.
*H04W 52/02* (2009.01)
*G06F 1/32* (2006.01)

(52) U.S. Cl.
CPC ..... *H04W 52/0229* (2013.01); *H04W 52/029* (2013.01); *H04W 52/0251* (2013.01); *Y02B 60/50* (2013.01)

(58) Field of Classification Search
CPC H04N 19/42; G06F 1/32; G06F 1/324; G06F 1/329
See application file for complete search history.

(56) References Cited

U.S. PATENT DOCUMENTS

| | | | | |
|---|---|---|---|---|
| 5,898,695 | A * | 4/1999 | Fujii | H04N 5/4401 348/423.1 |
| 8,689,037 | B2 * | 4/2014 | Rychlik | G06F 1/3203 713/600 |
| 8,799,698 | B2 * | 8/2014 | Singvall | 713/300 |
| 2003/0118112 | A1 * | 6/2003 | Son | H04N 19/61 375/240.25 |
| 2008/0025409 | A1 * | 1/2008 | Tseng | H04N 19/44 375/240.25 |
| 2008/0028249 | A1 * | 1/2008 | Agrawal | G06F 1/3203 713/501 |
| 2008/0079732 | A1 * | 4/2008 | Park | G09G 3/003 345/501 |
| 2009/0109988 | A1 * | 4/2009 | Musunuri | G06F 3/14 370/412 |
| 2009/0135752 | A1 * | 5/2009 | Su | H04W 52/029 370/311 |
| 2009/0251616 | A1 * | 10/2009 | Seo | H04N 5/4401 348/726 |
| 2012/0079357 | A1 * | 3/2012 | Salsbery | H04W 24/08 714/799 |

(Continued)

*Primary Examiner* — Scott M Sciacca
(74) *Attorney, Agent, or Firm* — Neugeboren O'Dowd PC (57) ABSTRACT

A method and computing apparatus for controlling operation of hardware processing components are disclosed. The method may include receiving a data packet (e.g., a media frame) at the computing device, processing the data packet with a plurality of hardware components to display the data packet, and monitoring movement of the data packet among the hardware components. A time indication for each hardware component is generated that indicates when the data packet will be received, and a frequency of each of the hardware components is adjusted based upon when the frame will arrive to be processed.

8 Claims, 5 Drawing Sheets

(56) References Cited

U.S. PATENT DOCUMENTS

| | | | | |
|---|---|---|---|---|
| 2013/0007413 A1* | 1/2013 | Thomson | ........... | G06F 1/324 |
| | | | | 712/30 |
| 2013/0142049 A1* | 6/2013 | Jim | ........... | H04W 52/029 |
| | | | | 370/241 |
| 2013/0151879 A1* | 6/2013 | Thomson | ........... | G06F 1/329 |
| | | | | 713/322 |
| 2014/0184619 A1* | 7/2014 | Kim | ........... | G06T 1/20 |
| | | | | 345/519 |
| 2014/0301259 A1* | 10/2014 | Homchaudhuri | . | H04W 52/0216 |
| | | | | 370/311 |
| 2014/0301262 A1* | 10/2014 | Homchaudhuri | . | H04W 52/0235 |
| | | | | 370/311 |
| 2015/0156524 A1* | 6/2015 | Morotomi | ........... | H04N 21/242 |
| | | | | 725/116 |

\* cited by examiner

PROACTIVE CONTROL OF HARDWARE BASED UPON MONITORED PROCESSING

BACKGROUND

Field

The present disclosure relates generally to multi-core computing systems, and more specifically to controlling operation of multiple cores in a multi-core system.

Background

With the advent of multiple processors or multiple cores on a single chip (also known as SoCs), processing tasks have been distributed to various processors or cores that specialize in a given function to provide enhanced performance. For instance, some smartphones now comprise a core for OS activities including audio decoding, a core for video decoding, a core for rendering and composing graphical frames, a core for composing frames, another core for handling WiFi data, and yet another core for telephony.

When processors such as those listed above are operating on a power constrained device (e.g., a device utilizing battery power), it is important for the processors to keep power consumption low while providing the performance benefits associated with multiple processors. To keep power consumption low, it is known that the frequency and voltage on a processor may be reduced when the processor is operating under reduced loads. Although some existing systems may reduce the frequency and voltage of a processor to save power, these systems are typically reactive in nature; thus adversely affecting both power and performance.

Figure 1A:
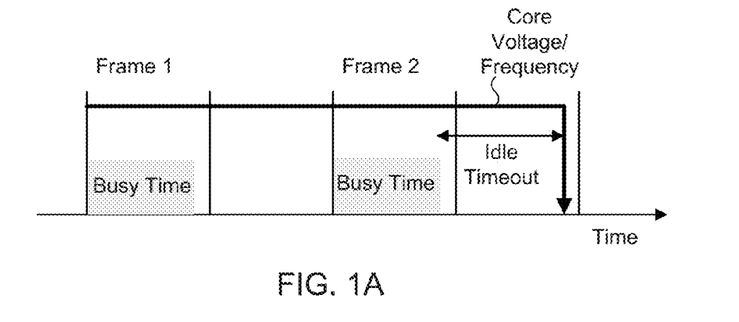
FIG. 1A is a timing chart for processor according to a method known in the art.

Referring to FIG. 1A for example, one approach for managing a processor includes the processor waiting for an idle time out before reducing the clock frequency and voltage. A disadvantage of this approach is that even after the completion of frame processing, the processor will wait for an idle timeout period before reducing frequency and voltage; thus adversely impacting power consumption. Another disadvantage is that the processor will not know when the next frame needs to be processed. As a consequence, there will be an increased power load that occurs due to the processor clock needing to be turned on to react to the increased processing requirements; thus adversely affecting performance.

Figure 1B:
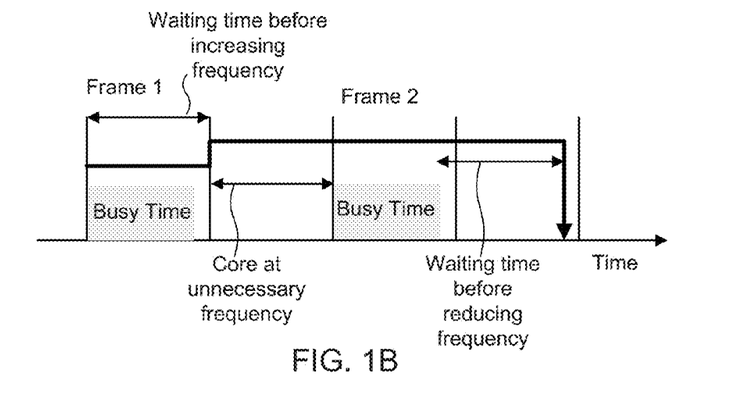
FIG. 1B is a timing chart for the processor according to another method known in the art.

Another approach depicted in FIG. 1B includes a processor waiting for a few frames before increasing or decreasing the frequency or voltage of the processor. As shown in this example, even though the processor is busy processing a frame, the processor waits for a few samples before increasing its frequency and voltage, but as shown, the increase in frequency may be too late to address the processing needs of the frame; thus adversely affecting performance. In addition, by virtue of waiting a few samples to react to a particular processing load, the frequency of the processor may be unnecessarily high; thus utilizing an increased level of power unnecessarily.

Figure 1C:
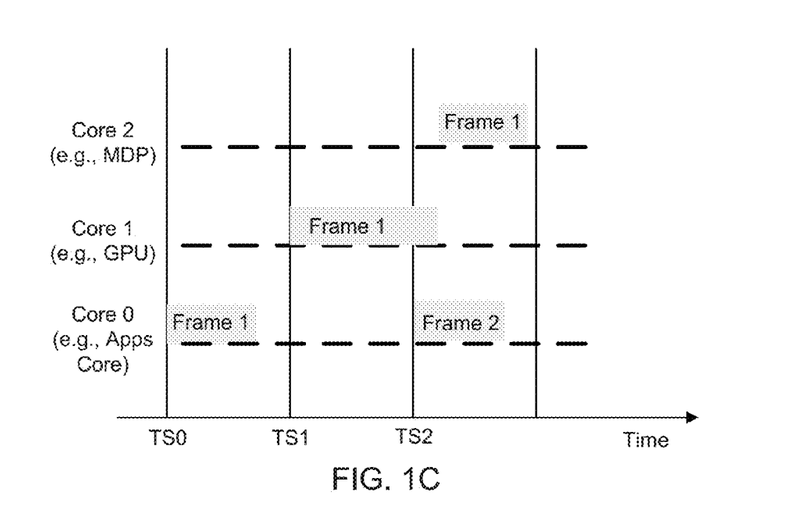
FIG. 1C is a timing chart depicting operation of three processors according to methodologies known in the art.

Another shortfall of current systems is a lack of a framework to detect a "bottleneck" that affects system performance. Referring to FIG. 1C, for example, a graphics processing unit ("GPU") is depicted as taking an extended period of time to process a frame (shown as frame 1); thus the GPU in this example, is effecting a bottleneck in the system processing. To address this issue, current systems may increase an application processor's frequency so that the application processor may process the frame more quickly (to enable the GPU to start processing the frame sooner), but this workaround does not necessarily improve the bottleneck while it necessarily results in increased power consumption.

In short, existing approaches to reduce power consumption of processing cores are generally reactive in nature, which adversely affects performance, and these approaches are less than optimal in terms of power management.

SUMMARY

One aspect of the disclosure can be characterized as a method for controlling operation of hardware processing components on a computing device. The method may include receiving a data packet at the computing device and processing the data packet with a plurality of hardware components to display the data packet. The movement of the data packet among the hardware components is monitored, and based upon the monitoring, a frequency of each of the hardware components is adjusted to improve performance while reducing power consumption.

Another aspect of this disclosure may be characterized as a computing device that includes a network interface to receive content, a plurality of hardware components to obtain and process data packets from the content to generate displayable content, and a display to display the displayable content. A frame monitor component monitors movement of the data packet among the hardware components, and each of a plurality of clock scaling components scale a frequency of a corresponding one of the plurality of hardware devices based upon the frame monitoring.

DETAILED DESCRIPTION

Figure 2:
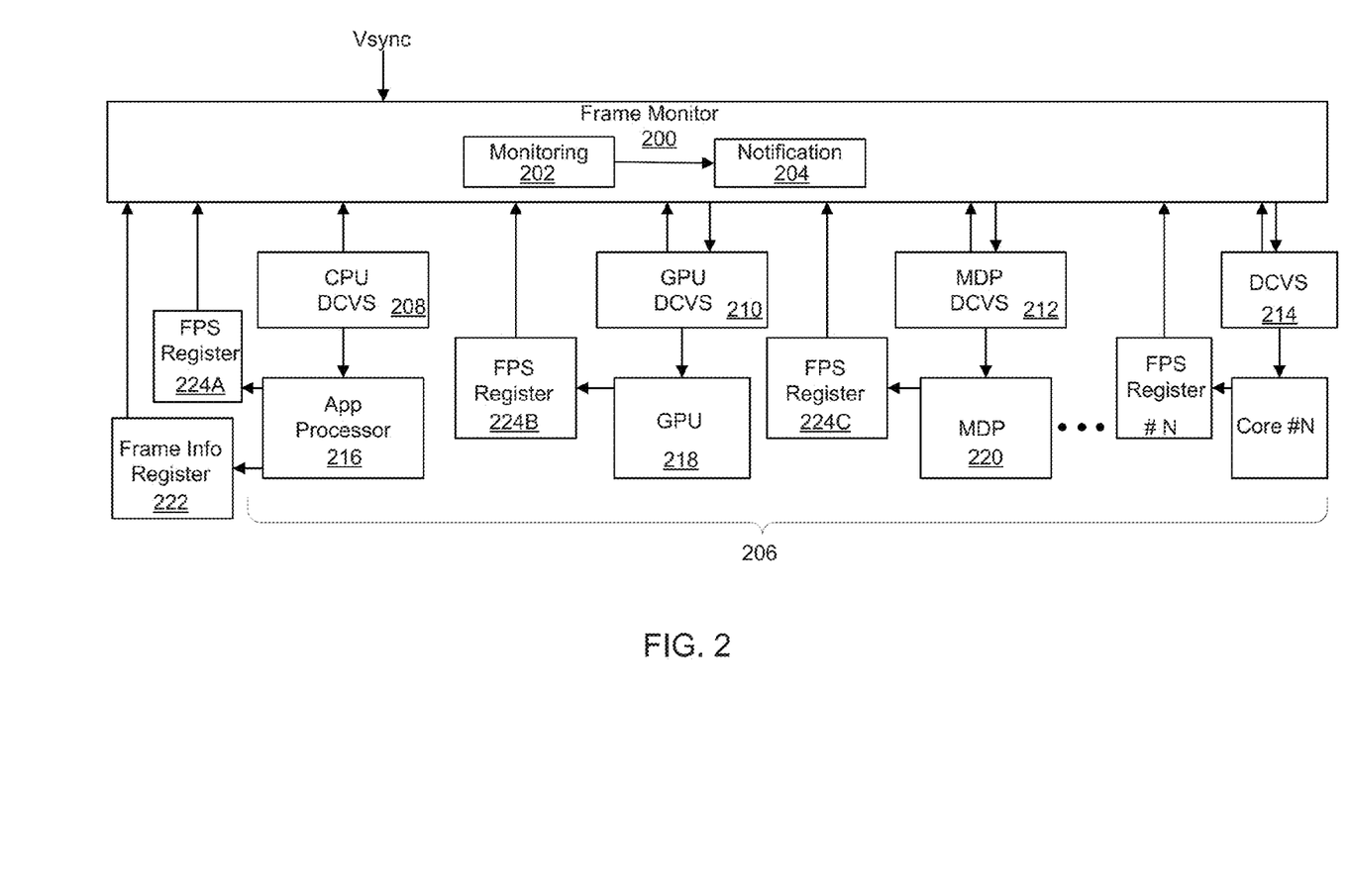
FIG. 2 is a block diagram depicting an embodiment.

Referring to FIG. 2 it is a block diagram depicting components that may be implemented in a computing device. As shown, this embodiment includes a frame monitor 200 that includes a monitoring component 202 and a notification component 204. As depicted, the frame monitor 200 is coupled to N hardware components 206 via a plurality of dynamic clock and voltage scaling ("DCVS") components 208, 210, 212, 214. As shown, the N hardware components may include an application processor 216, a graphics processing unit 218 ("GPU"), a mobile display processor ("MDP") 220, and other processors not shown for simplicity, which may include a digital signal processor ("DSP") among other potential types of processors. As depicted, each of the processors may be controlled by a corresponding one of the N DCVS components.

The depicted components may be implemented in a computing device such as a smartphone, tablet, netbook, etc. And although not required, the hardware components 206 may be implemented as part of a system on a chip ("SoC"), and the frame monitor 200 and the DCVS components 208, 210, 212, 214 may be implemented as kernel-layer constructs in the computing device. For example, the frame monitor 200 may be realized by augmenting the functionality of an existing LINUX kernel. As discussed above, the use of hardware components 206 that include specialized processors (e.g., the application processor 216, GPU 218, and MDP 220) provides enhanced processing performance as compared to implementations that utilize a general processor, but each of the hardware components 206 presents a power load to the computing device. As discussed above, prior approaches to managing power have (in limited respects) reduced the clock and voltage of processors in a less-than-optimal and reactive manner. For example, due to the unavailability of incoming data before hand in prior art approaches, hardware components maintain idle timeouts before they turn off or reduce their clocks and power subsystems. In addition, the clock and voltage scaling of prior art approaches impacted both power and performance. Moreover, the inability to monitor hardware components meant that the locations of processing bottlenecks was unknown, and as a consequence, the clocks of hardware components that were unrelated to the bottleneck were increased; thus using additional power that did not address the bottleneck.

To address the deficiency in prior approaches, the frame monitor 200 of the present embodiment monitors activities of the hardware components 206 and provides inputs to the DCVS components 208, 210, 212, 214 that enable each of the DCVS components 208, 210, 212, 214 to provide proactive and tailored scaling of hardware clock and voltages. For example, the monitoring component 202 of the frame monitor 200 may generally monitor movement of any of a variety of different types of data packets that are serially processed by the hardware components 206. The data packets may be, without limitation, WiFi packets, LTE packets, media frames, and command packets. For convenience, however, embodiments described herein are described in connection with the processing of media frames.

The notification component 204 informs all of the hardware components 206 about arrival times of incoming data packets or frames. Thus each of the hardware components 206 is prepared with a clock frequency (e.g., just before a frame arrives) to provide substantially improved, if not optimal, power and performance. In addition, the monitoring component may also monitor the frames per second ("FPS") at each of the hardware components, and may compare calculated FPS values with expected FPS values to detect bottlenecks in the hardware components 206 and target specific ones of the hardware components 206 for increased clocking without unnecessarily increasing the clock and voltage (and hence power consumption) of other hardware components 206.

As shown in FIG. 2, the embodiment includes a frame information register 222 to store information about an incoming frame. For example, when the application processor 216 receives a media frame, the application processor 216 may read the header of the frame to determine a type and size of the media frame. This information about type and size of the frame may be placed in the frame information register 222, and then read by the monitoring component 202. In addition, the application processor 216 may initiate an interrupt request ("IRQ") when the frame is received to inform the monitoring component 202 about the receipt of the frame. Also depicted are N frame per second (FPS) registers, and each of the N FPS registers is in communication with a corresponding one of the N hardware components. In general, each of the hardware components 206 may provide an FPS update to a corresponding one of the N FPS registers so that the frame processing rate at each hardware component 206 may be monitored by the monitoring component 202 of the frame monitor 200. In this way, the particular hardware component 206 causing any slowdown or bottleneck may be identified and responsively controlled to alleviate the slowdown (e.g., by increasing a frequency of that hardware component). For example, the frequency of each of the hardware components may be adjusted based upon the type and size information so that each of the hardware components completes its processing of the data packet within a particular time window, and as discussed below, Vsync signals may be received that define boundaries of the particular time window.

Figure 3:
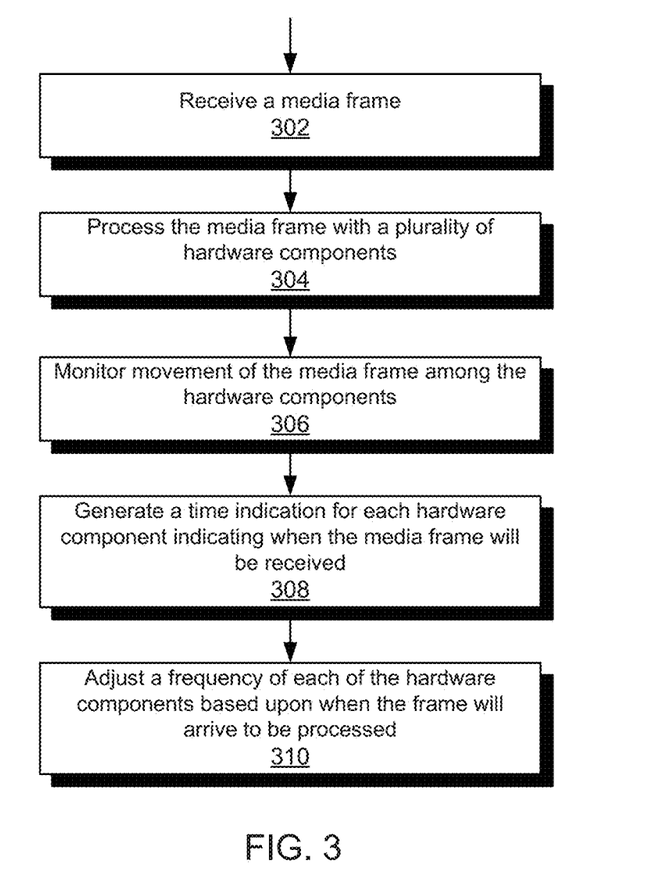
FIG. 3 is a flowchart depicting a method that may be traversed in connection with the embodiment depicted in FIG. 2.

While referring to FIG. 2, simultaneous reference is made to FIG. 3, which is a flow chart depicting a method that may be traversed in connection with the embodiment depicted in FIG. 2. As shown, when a media frame is received by the computing device (e.g., from a remote website or locally stored file)(Block 302), the hardware components 206 process the media file to display the media frame (Block 304). In the embodiment depicted in FIG. 2, the application processor 216 initially receives the media frame before the GPU 218 or MDP 220, and the application processor 216 generates an IRQ so that the frame monitor 200 is aware that the application processor 216 has received the media frame. In addition, the application processor 216 determines what specific type of frame the media frame is, and also determines a size of the media frame. This information about the size and frame type is stored in the frame information register 222 for the monitoring component 202 of the frame monitor 200 to access.

In addition, the frame monitor 200 monitors movement of the media frame among the hardware components 206 as the media frame is processed (Block 306). As depicted, the frame monitor 200 receives a Vsync signal at periodic, and configurable, time intervals. For example, a Vsync signal may be generated every 100 ms. Based upon the time between the Vsync signals and the number of media frames that are processed by each of the hardware components 206, the number of frames per second being processed by a hardware component 206 may be calculated.

As shown in FIG. 3, the frame monitor 200 may generate a time indication for each hardware component 206 that indicates when the media frame will be received (Block 308), and the frequency of each of the hardware components 206 will be adjusted based upon when the frame will arrive to be processed (Block 310). For example, the frame monitor 200 may notify each of the DCVS components 208, 210, 212 about when the frame will arrive at the corresponding hardware component 206; thus enabling the scaling of clock and voltage to increase in close connection with the arrival of the frame (e.g., just before, at the same time as, or just after the frame arrives). And the scaling of the clock and voltage may be decreased immediately after the frame is processed until another frame is received.

Figure 4:
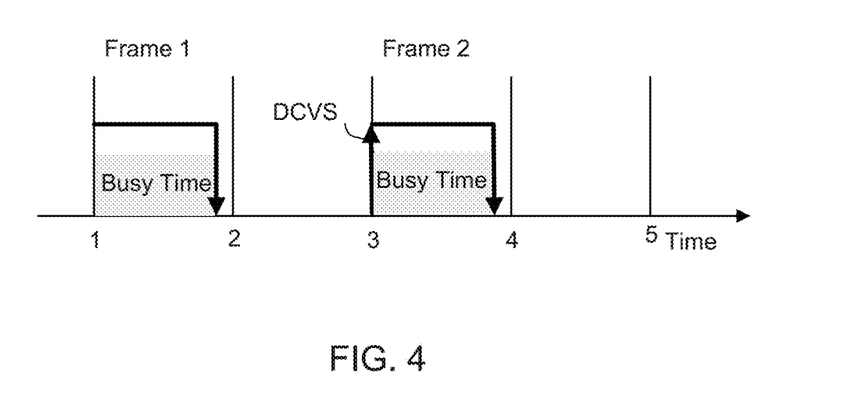
FIG. 4 is a timing chart depicting operation of a processor consistent with the method depicted in FIG. 3.

Referring to FIG. 4 for example, shown is a timing chart depicting clock and voltage scaling versus time consistent with the method depicted in FIG. 3. As shown, the clock and voltage scaling is timed to increase while a frame is being processed and to decrease when there is no frame present for processing. In addition, the magnitude of the scaling may be based upon the type and size of the frame that is received. In this way, the timing of the scaling may be proactively controlled based upon when the frame is anticipated to be received, and the magnitude of the scaling may be based upon the complexity and size of the frame so that the frame may be processed within the time boundaries established by the Vsync signal. Thus performance is improved and power consumption is reduced relative to prior art approaches (e.g., the prior art approaches described with reference to FIGS. 1A and 1B).

More specifically, a hardware component 206 does not need to wait for load statistics to enable/increase the clock. Each DCVS component 208, 210, 212 may configure settings before processing the frame because it has already been notified about an incoming data packet or frame. As a consequence, the frame monitor 200 (and the method described with reference to FIG. 3) provides better performance relative to the prior art approaches. In addition, a hardware component 206 does not need to wait for an idle time out to turn off the clock; thus reducing power consumption. With respect to the GPU 218 and MDP 220 a lot of power is saved because these hardware components are ordinarily on (e.g., the GPU 218 and MDP 220 may use an idle timer of 80 ms before turning off their clocks). With the present embodiments, 60 and 30 fps clips can execute at low power modes.

Figure 5:
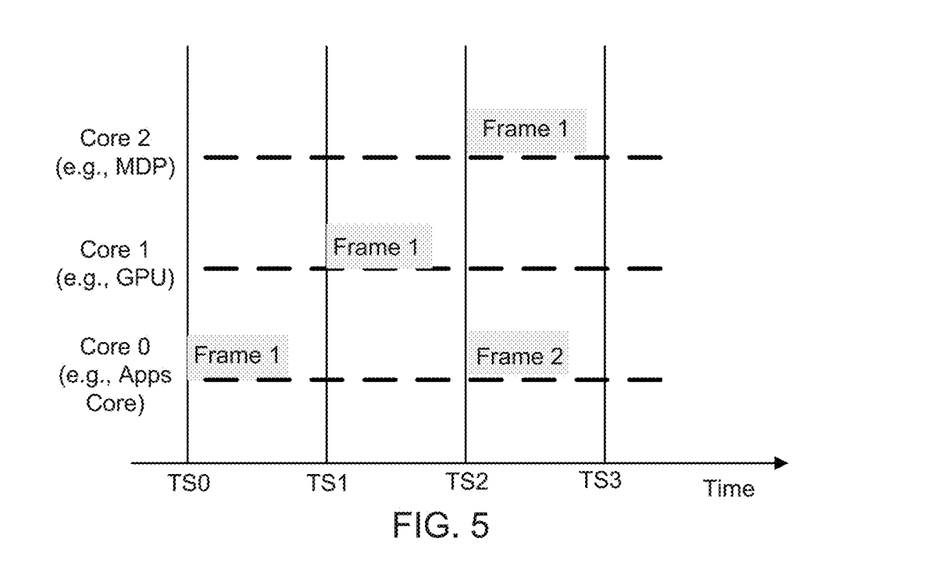
FIG. 5 is another timing chart depicting operation of multiple processors consistent with the method depicted in FIG. 3.

Referring next to FIG. 5, shown is a timing chart that depicts the life cycle of a media frame in accordance with the embodiment depicted in FIG. 2 and the method depicted in FIG. 3. As shown, at the depicted time sample TS0, the application processor 216 knows that there is a frame update at TS0 and informs frame monitor 200, and the frame monitor 200 informs the GPU 218 that the GPU 218 will be receiving a frame at time sample TS1. The frame monitor then informs the MDP 220 that the MDP 220 will be receiving a frame at time sample TS2. The GPU 218 and MDP 220 will need to enable clocks only at that point of time. At time sample TS1, the application processor 216 informs the frame monitor 200 that there is no frame at TS1, and the frame monitor 200 informs the GPU 218 and MDP 220 that there will not be any frame at TS2 and TS3 respectively. Thus the DCVS components 210, 212 that control the clocks of the GPU 218 and MDP 220 may enable the GPU 218 and MDP 220 to enter a sleep mode.

Still referring to FIG. 5, a mode of operation that mitigates against any bottlenecks is described. As shown, the application processor 216 informs the frame monitor 200 that a frame is received at TS1, the application processor 216 may then update the application processor's maximum FPS (M_FPS) in the FPS register 224A. The frame monitor 200 then informs the GPU 218 that there will be new frame in next time sample TS2, and the GPU 218 computes an average FPS based on a history (for a predetermined amount of time) compares it with M_FPS. The GPU DCVS 210 then increases or decreases frequency (or clock gate) for the next time sample TS2 based on several factors that may include current load, number of frames, frame complexity and required FPS. As depicted, each of the GPU 218 and the MDP 220 are also in communication with a corresponding FPS register 224B, 224C to enable the GPU 218 and MDP 220 to provide an indication of the number of FPS that each is processing. This enables frame movement to be monitored through the hardware components 106 and the frequency of each hardware component to be adjusted based upon frame movement. Thus every Subsystem runs at optimal frequencies and provides better power and performance.

Figure 6:
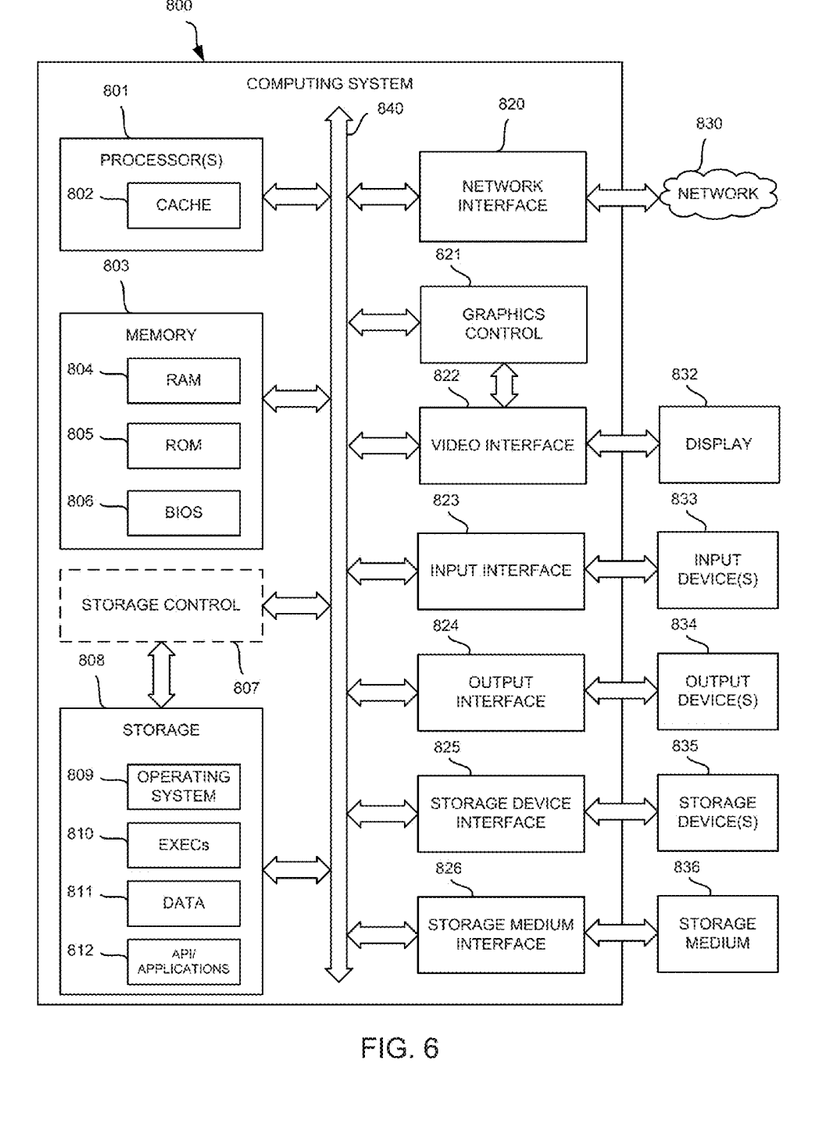
FIG. 6 is an embodiment of a computing device that may be utilized to realize the embodiment described with reference to FIG. 2.

The systems and methods described herein can be implemented in a computing system in addition to the specific physical devices described herein. FIG. 6 shows a diagrammatic representation of one embodiment of a computing system 800 within which a set of instructions can execute for causing a device to perform or execute any one or more of the aspects and/or methodologies of the present disclosure. The components in FIG. 8 are examples only and do not limit the scope of use or functionality of any hardware, software in combination with hardware, firmware, embedded logic component, or a combination of two or more such components implementing particular embodiments of this disclosure. Some or all of the illustrated components can be part of the computer system 800. For instance, the computer system 800 can be a general purpose computer (e.g., a laptop computer) or an embedded logic device (e.g., an FPGA), to name just two non-limiting examples.

Computer system 800 includes at least a processor 801 such as a central processing unit (CPU) or an FPGA to name two non-limiting examples. Hardware components 216, 218, and 220 in FIG. 2 each show exemplary implementations of the processor 801. The computing system 800 may also comprise a memory 803 and a storage 808, both communicating with each other, and with other components, via a bus 840. The bus 840 may also link a display 832, one or more input devices 833 (which may, for example, include a keypad, a keyboard, a mouse, a stylus, etc.), one or more output devices 834, one or more storage devices 835, and various non-transitory, tangible processor-readable storage media 836 with each other and with one or more of the processor 801, the memory 803, and the storage 808. All of these elements may interface directly or via one or more interfaces or adaptors to the bus 840. For instance, the various non-transitory, tangible processor-readable storage media 836 can interface with the bus 840 via storage medium interface 826. Computing system 800 may have any suitable physical form, including but not limited to one or more integrated circuits (ICs), printed circuit boards (PCBs), mobile handheld devices (such as mobile telephones or PDAs), laptop or notebook computers, distributed computer systems, computing grids, or servers.

Processor(s) 801 (or central processing unit(s) (CPU(s))) optionally contains a cache memory unit 802 for temporary local storage of instructions, data, or computer addresses. Processor(s) 801 are configured to assist in execution of processor-readable instructions stored on at least one non-transitory, tangible computer-readable storage medium. Computing system 800 may provide functionality as a result of the processor(s) 801 executing software embodied in one or more non-transitory, tangible computer-readable storage media, such as memory 803, storage 808, storage devices 835, and/or storage medium 836 (e.g., read only memory (ROM)). For instance, the method of operating a multi-core system resulting in the timing charts of FIGS. 2 and 3 may be embodied in one or more non-transitory, tangible processor-readable storage media. The non-transitory, tangible computer-readable storage media may store software that implements particular embodiments, such as the methods behind the timing charts of FIGS. 2 and 3, and processor(s) 801 may execute the software. Memory 803 may read the software from one or more other non-transitory, tangible computer-readable storage media (such as mass storage device(s) 835, 836) or from one or more other sources through a suitable interface, such as network interface 820. A wireless network interface on a smartphone is one embodiment of the network interface 820. The software may cause processor(s) 801 to carry out one or more processes or one or more steps of one or more processes described or illustrated herein. Carrying out such processes or steps may include defining data structures stored in memory 803 and modifying the data structures as directed by the software. In some embodiments, an FPGA can store instructions for carrying out functionality as described in this disclosure (e.g., the methods behind the timing charts in FIGS. 2 and 3). In other embodiments, firmware includes instructions for carrying out functionality as described in this disclosure (e.g., the methods behind the timing charts in FIGS. 2 and 3).

The memory 803 may include various components (e.g., non-transitory, tangible computer-readable storage media) including, but not limited to, a random access memory component (e.g., RAM 804) (e.g., a static RAM "SRAM", a dynamic RAM "DRAM, etc.), a read-only component (e.g., ROM 805), and any combinations thereof. ROM 805 may act to communicate data and instructions unidirectionally to processor(s) 801, and RAM 804 may act to communicate data and instructions bidirectionally with processor(s) 801. ROM 805 and RAM 804 may include any suitable non-transitory, tangible computer-readable storage media described below. In some instances, ROM 805 and RAM 804 include non-transitory, tangible computer-readable storage media for carrying out the methods behind the timing charts in FIGS. 2 and 3. In one example, a basic input/output system 806 (BIOS), including basic routines that help to transfer information between elements within computer system 800, such as during start-up, may be stored in the memory 803.

Fixed storage 808 is connected bidirectionally to processor(s) 801, optionally through storage control unit 807. Fixed storage 808 provides additional data storage capacity and may also include any suitable non-transitory, tangible computer-readable media described herein. Storage 808 may be used to store operating system 809, EXECs 810 (executables), data 811, API applications 812 (application programs), and the like. For instance, the storage 808 could be implemented for storage of a duration of the processing period as described in FIGS. 2 and 3. Often, although not always, storage 808 is a secondary storage medium (such as a hard disk) that is slower than primary storage (e.g., memory 803). Storage 808 can also include an optical disk drive, a solid-state memory device (e.g., flash-based systems), or a combination of any of the above. Information in storage 808 may, in appropriate cases, be incorporated as virtual memory in memory 803.

In one example, storage device(s) 835 may be removably interfaced with computer system 800 (e.g., via an external port connector (not shown)) via a storage device interface 825. Particularly, storage device(s) 835 and an associated machine-readable medium may provide nonvolatile and/or volatile storage of machine-readable instructions, data structures, program modules, and/or other data for the computer system 800. In one example, software may reside, completely or partially, within a machine-readable medium on storage device(s) 835. In another example, software may reside, completely or partially, within processor(s) 801.

Bus 840 connects a wide variety of subsystems. Herein, reference to a bus may encompass one or more digital signal lines serving a common function, where appropriate. Bus 840 may be any of several types of bus structures including, but not limited to, a memory bus, a memory controller, a peripheral bus, a local bus, and any combinations thereof, using any of a variety of bus architectures. As an example and not by way of limitation, such architectures include an Industry Standard Architecture (ISA) bus, an Enhanced ISA (EISA) bus, a Micro Channel Architecture (MCA) bus, a Video Electronics Standards Association local bus (VLB), a Peripheral Component Interconnect (PCI) bus, a PCI-Express (PCI-X) bus, an Accelerated Graphics Port (AGP) bus, HyperTransport (HTX) bus, serial advanced technology attachment (SATA) bus, and any combinations thereof.

Computing system 800 may also include an input device 833. In one example, a user of computer system 800 may enter commands and/or other information into computer system 800 via input device(s) 833. Examples of an input device(s) 833 include, but are not limited to, an alpha-numeric input device (e.g., a keyboard), a pointing device (e.g., a mouse or touchpad), a touchpad, a joystick, a gamepad, an audio input device (e.g., a microphone, a voice response system, etc.), an optical scanner, a video or still image capture device (e.g., a camera), and any combinations thereof. Input device(s) 833 may be interfaced to bus 840 via any of a variety of input interfaces 823 (e.g., input interface 823) including, but not limited to, serial, parallel, game port, USB, FIREWIRE, THUNDERBOLT, or any combination of the above.

In particular embodiments, when computing system 800 is connected to network 830 (such as a cellular network), computing system 800 may communicate with other devices, such as mobile devices and enterprise systems, connected to network 830. Communications to and from computing system 800 may be sent through network interface 820. For example, network interface 820 may receive incoming communications (such as requests or responses from other devices) in the form of one or more packets (such as Internet Protocol (IP) packets) from network 830, and computing system 800 may store the incoming communications in memory 803 for processing. Computing system 800 may similarly store outgoing communications (such as requests or responses to other devices) in the form of one or more packets in memory 803 and communicated to network 830 from network interface 820. Processor(s) 801 may access these communication packets stored in memory 803 for processing.

Examples of the network interface 820 include, but are not limited to, a network interface card, a modem, and any combination thereof. Examples of a network 830 or network segment 830 include, but are not limited to, a wide area network (WAN) (e.g., the Internet, an enterprise network), a local area network (LAN) (e.g., a network associated with an office, a building, a campus or other relatively small geographic space), a telephone network, a direct connection between two computing devices, and any combinations thereof. For instance, a cellular or home WiFi network are exemplary implementations of the network 830. A network, such as network 830, may employ a wired and/or a wireless mode of communication. In general, any network topology may be used.

Information and data can be displayed through a display 832. Examples of a display 832 include, but are not limited to, a liquid crystal display (LCD), an organic liquid crystal display (OLED), a cathode ray tube (CRT), a plasma display, and any combinations thereof. The display 832 can interface to the processor(s) 801, memory 803, and fixed storage 808, as well as other devices, such as input device(s) 833, via the bus 840. The display 832 is linked to the bus 840 via a video interface 822, and transport of data between the display 832 and the bus 840 can be controlled via the graphics control 821.

In addition to a display 832, computer system 800 may include one or more other peripheral output devices 834 including, but not limited to, an audio speaker, a printer, and any combinations thereof. Such peripheral output devices may be connected to the bus 840 via an output interface 824. Examples of an output interface 824 include, but are not limited to, a serial port, a parallel connection, a USB port, a FIREWIRE port, a THUNDERBOLT port, and any combinations thereof.

In addition or as an alternative, computing system 800 may provide functionality as a result of logic hardwired or otherwise embodied in a circuit, which may operate in place of or together with software to execute one or more processes or one or more steps of one or more processes described or illustrated herein. Reference to software in this disclosure may encompass logic, and reference to logic may encompass software. Moreover, reference to a non-transitory, tangible computer-readable medium may encompass a circuit (such as an IC) storing software for execution, a circuit embodying logic for execution, or both, where appropriate. The present disclosure encompasses any suitable combination of hardware, software, or both.

Those of skill in the art will understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Within this specification, the same reference characters are used to refer to terminals, signal lines, wires, etc. and their corresponding signals. In this regard, the terms "signal," "wire," "connection," "terminal," and "pin" may be used interchangeably, from time-to-time, within the this specification. It also should be appreciated that the terms "signal," "wire," or the like can represent one or more signals, e.g., the conveyance of a single bit through a single wire or the conveyance of multiple parallel bits through multiple parallel wires. Further, each wire or signal may represent bi-directional communication between two, or more, components connected by a signal or wire as the case may be.

Those of skill will further appreciate that the various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The various illustrative logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the embodiments disclosed herein (e.g., the methods behind the timing charts in FIGS. 2 and 3) may be embodied directly in hardware, in a software module executed by a processor, a software module implemented as digital logic devices, or in a combination of these. A software module may reside in RAM memory, flash memory, ROM memory, EPROM memory, EEPROM memory, registers, hard disk, a removable disk, a CD-ROM, or any other form of non-transitory, tangible computer-readable storage medium known in the art. An exemplary non-transitory, tangible computer-readable storage medium is coupled to the processor such that the processor can read information from, and write information to, the non-transitory, tangible computer-readable storage medium. In the alternative, the non-transitory, tangible computer-readable storage medium may be integral to the processor. The processor and the non-transitory, tangible computer-readable storage medium may reside in an ASIC. The ASIC may reside in a user terminal. In the alternative, the processor and the non-transitory, tangible computer-readable storage medium may reside as discrete components in a user terminal. In some embodiments, a software module may be implemented as digital logic components such as those in an FPGA once programmed with the software module.

The previous description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the principles and novel features disclosed herein.

What is claimed is:

1. A method for controlling operation of hardware processing components on a computing device, the method comprising:
   receiving a data packet at the computing device;
   processing the data packet with a plurality of processors to display the data packet;
   monitoring movement of the data packet among the processors;
   generating, based upon the monitoring, time indications, each of the time indications indicating when a corresponding one of the processors will receive the data packet;
   monitoring a frame processing rate of each of the plurality of processors; and
   adjusting, in response to a particular time indication indicating a particular processor is going to receive the data packet, a frequency of the particular processor based upon the frame processing rate of a processor that previously processed the data packet;
   initiating an interrupt when an application processor receives the data packet;
   obtaining type and size information about the data packet;
   adjusting the frequency of each of the processors based upon the type and size information so that each of the processors completes its processing of the data packet within a particular time window; and receiving Vsync signals that define boundaries of the particular time window.

2. The method of claim 1, wherein the application processor reads a header of the data packet to obtain the type and size information about the data packet.

3. The method of claim 1, wherein the frequency of each of the processors is adjusted before the data packet arrives to be processed.

4. A computing device comprising:

a network interface to receive content;

a plurality of processors to obtain and process data packets from the content to generate displayable content;

a display to display the displayable content;

a frame monitor configured to:

receive Vsync signals that define boundaries of a particular time window;

monitor movement of a data packet among the processors; and generate, based upon the monitoring, time indications that each indicate when a corresponding one of the processors will receive the data packet;

wherein the processors include an application processor that initially receives the data packet and generates an interrupt when the data packet is received to inform the frame monitor that the data packet is received; wherein the application processor obtains frame type and frame size information from the data packet and provides the frame size and frame type information to the frame monitor; and a plurality of clock scaling components, each of the clock scaling components configured to receive a time indication from the frame monitor and scale a frequency of a corresponding one of the plurality of processors based upon a frame processing rate of a processor that previously processed the data packet and based upon the type and size information so that each of the processors completes its processing of the data packet within the particular time window.

5. The computing device of claim 4, wherein the processors include processors selected from the group consisting of an application processor, graphics processing unit, mobile display processor, and a digital signal processor.

6. A non-transitory, tangible processor readable storage medium, encoded with processor readable instructions to perform a method for operating a plurality of hardware components, the method comprising:

receiving a data packet at the computing device;

processing the data packet with a plurality of processors to display the data packet;

monitoring movement of the data packet among the processors;

generating, based upon the monitoring, time indications, each of the time indications indicating when a corresponding one of the processors will receive the data packet;

monitoring a frame processing rate of each of the processors; and adjusting, in response to a particular time indication indicating a particular processor is going to receive the data packet, a frequency of the particular processor based upon the frame processing rate of a processor that previously processed the data packet;

initiating an interrupt when an application processor receives the data packet;

obtaining type and size information about the data packet;

adjusting the frequency of each of the processors based upon the type and size information so that each of the hardware components completes its processing of the data packet within a particular time window; and receiving Vsync signals that define boundaries of the particular time window.

7. The non-transitory, tangible processor readable storage medium of claim 6, the method including reading a header of the data packet to obtain the type and size information about the data packet.

8. The non-transitory, tangible processor readable storage medium of claim 6, wherein the frequency of each of the processors is adjusted before the data packet arrives to be processed.

* * * * *